UNITED STATES PATENT OFFICE.

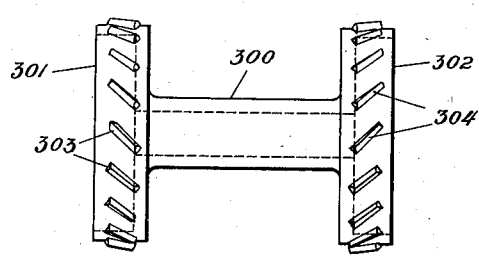
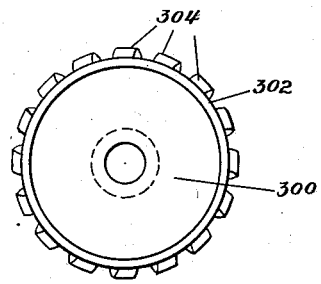
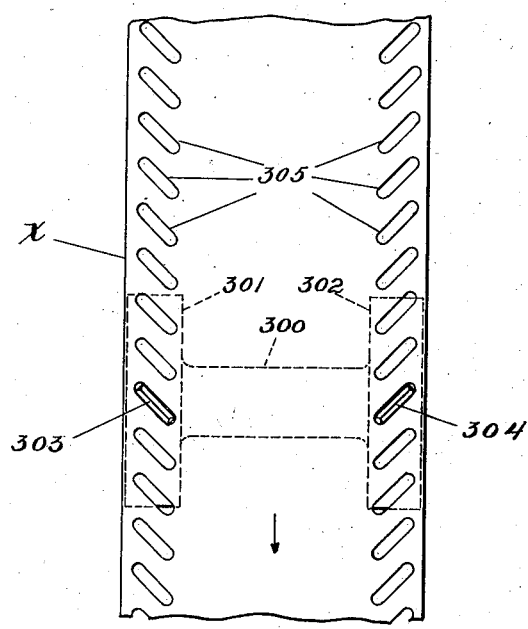

JOHN DARBY, OF SUMMIT, NEW JERSEY, ASSIGNOR OF ONE-HALF TO EDWIN F. FLINDELL, OF SUMMIT, NEW JERSEY.

SPROCKET-DRUM AND FILM FOR MOTION-PICTURE-PROJECTING MACHINES.

1,361,144.  Specification of Letters Patent.  Patented Dec. 7, 1920.

Original application filed March 1, 1918, Serial No. 219,752. Divided and this application filed December 11, 1918. Serial No. 266,251.

*To all whom it may concern:*

Be it known that I, JOHN DARBY, a citizen of the United States, residing at Summit, in the county of Union and State of New Jersey, have invented certain new and useful Improvements in Sprocket-Drums and Films for Motion-Picture-Projecting Machines, of which the following is a specification.

The invention relates to that part of a motion picture projecting machine, which employs a toothed sprocket drum to positively feed the perforated film strip through the machine and momentarily maintain a picture of the film strip in the frame with the aperture plate for projection upon the screen.

The objects of the invention are to provide such a sprocket drum, with teeth so formed and disposed, that in combination with a coacting film strip, the said strip will be centralized in its passage past the aperture plate, causing a uniform registration of each succeeding picture in the aperture of said plate; to prevent the lateral displacement of the film strip with the consequent projection of the film perforations, so often seen upon the screen and also to flatten the film against the aperture and thus effect a sharper projection of the picture upon the screen.

This case is a division of my copending application, Serial No. 219,752, filed March 1, 1918.

Of the drawings:

Figure 1 is an elevation of a film moving sprocket drum showing elongated and inclined sprocket teeth.

Fig. 2 is an end elevation of Fig. 1.

Fig. 3 is an elevation of the film strip with centralizing perforations in engagement with the inclined teeth of the sprocket drum.

As disclosed by the accompanying drawings, the sprocket drum is made up in the well known form, with a central cylindrical body 300 having disposed at either end enlarged cylindrical heads 301 and 302; said heads are respectively provided with elongated teeth 303, 303 and 304, 304 which are inclined to the axis of said sprocket drum and may be designated as being portions or interruptions of multiple threads; the teeth on head 301 being right hand and those on head 302 being left hand in their inclination to the axis of said sprocket drum.

Correspondingly elongated and inclined slots or perforations 305, 305 are provided in the edges of the film strip X and are adapted to be engaged by the elongated and inclined teeth 303 and 304 of the said sprocket drum.

As viewed in Fig. 3 the film strip X is being moved downwardly by the sprocket drum 300 in the direction indicated by the arrow, the oppositely inclined teeth 303 and 304 of said drum, by their wedging action in the correspondingly inclined perforations 305, 305 of the film strip X, will maintain the vertical axis of said strip in perfect alinement, preventing any lateral displacement of said axis which would tend to allow the perforations to fall within the projected area of said film.

In a similar manner the outer edges of the inclined teeth 303 and 304 of sprocket drum 300, by their pressure against the outer edges of the perforations 305, 305 of film strip X, tend to stretch or flatten and to prevent the buckling of said film strip, and so insure a closely focused and sharp picture being projected upon the screen.

It will be evident from the foregoing that means have been provided realizing the objects and advantages herein pointed out.

It will be further understood, that modifications may be made from the precise form of such means herein shown and described, within the accompanying claims, without departing from the other principles of the invention and without sacrificing its objects and advantages.

I claim:

1. In a motion picture projecting machine, a driving sprocket drum comprised of a body member with two integral heads or flanges, one of said heads being disposed at either end of said body member and a set of axially inclined teeth on each of said heads, the teeth on both heads having coincident elementary cylindrical position.

2. In a motion picture projecting machine, a driving sprocket drum comprised of a body member with two integral heads or flanges, one of said heads being disposed at either end of said body member and a set of axially inclined teeth on each of said heads, the teeth on one of said heads being inclined in one direction and on the other of said heads in the opposite direction axially and the teeth on both heads having coincident elementary cylindrical position.

3. In a motion picture projecting machine, a driving sprocket drum comprised of a body member with two integral heads or flanges, one of said heads being disposed at either end of said body member and a set of oppositely axially inclined teeth on each of said heads and in combination a film strip provided with elongated and inclined perforations adapted to be engaged, centralized, flattened and driven by the teeth of said sprocket drum.

4. In a motion picture projecting machine, a driving sprocket drum comprised of a body member with two integral heads or flanges, one of said heads being disposed at either end of said body member and a set of oppositely axially inclined teeth on each of said heads, the teeth on both heads having coincident elementary cylindrical position and in combination a film strip provided with elongated and inclined perforations adapted to be engaged, centralized, flattened and driven by the teeth of said sprocket drum.

In testimony whereof, I have signed my name to this specification, in the presence of two subscribing witnesses.

JOHN DARBY.

Witnesses:
   CHARLES C. BRESEE,
   E. S. ECKARDT.